(12) United States Patent
Breuer et al.

(10) Patent No.: US 8,978,920 B2
(45) Date of Patent: Mar. 17, 2015

(54) SEALING ASSEMBLIES AND PRESSURIZED FLUID VESSELS INCLUDING THE SEALING ASSEMBLIES

(71) Applicant: GM Global Technology Operations LLC, Detroit, MI (US)

(72) Inventors: Patrick Breuer, Montabaur (DE); Axel Heise, Mainz (DE)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/202,143

(22) Filed: Mar. 10, 2014

(65) Prior Publication Data

US 2014/0263366 A1    Sep. 18, 2014

Related U.S. Application Data

(60) Provisional application No. 61/781,320, filed on Mar. 14, 2013.

(51) Int. Cl.
*F17C 1/00* (2006.01)
*F16K 1/34* (2006.01)
*F17C 13/06* (2006.01)

(52) U.S. Cl.
CPC . *F17C 1/005* (2013.01); *F16K 1/34* (2013.01); *F17C 13/06* (2013.01)
USPC ....................................................... 220/586

(58) Field of Classification Search
CPC ....................................................... F17C 13/06
USPC ......... 220/286, 586, 202, 592, 582, 581, 612, 220/611
See application file for complete search history.

(56) References Cited

U.S. PATENT DOCUMENTS

| 8,186,536 | B2 |   | 5/2012 | Strack |   |
| 8,505,762 | B2 | * | 8/2013 | Holbach et al. | 220/586 |
| 8,733,581 | B1 | * | 5/2014 | Olson | 220/588 |
| 2003/0089723 | A1 | * | 5/2003 | Funck | 220/581 |
| 2009/0255940 | A1 | * | 10/2009 | Murate et al. | 220/592 |
| 2011/0204063 | A1 |   | 8/2011 | Breuer et al. |   |
| 2011/0210127 | A1 |   | 9/2011 | Strack et al. |   |
| 2011/0210128 | A1 |   | 9/2011 | Strack et al. |   |
| 2011/0304083 | A1 |   | 12/2011 | Strack |   |

* cited by examiner

*Primary Examiner* — Steven A. Reynolds
*Assistant Examiner* — King M Chu
(74) *Attorney, Agent, or Firm* — Dinsmore & Shohl LLP

(57) ABSTRACT

Sealing assemblies may include a boss, a valve, a liner that defines a containment volume of a pressure vessel, and a support member adapted to cooperate with the liner and the valve. The support member may be formed from an anodized electrically conductive support material and generally has nonconductive surfaces in contact with the valve and the liner. Annular recesses having conductive surfaces are provided in the support member, and seals formed of conductive materials or having conductive surfaces are seated in the annular recesses. Thereby, when the valve is present in the sealing assembly, electric continuity between the valve and the liner is established through the electrically conductive surfaces of the seals, the electrically conductive surfaces of the annular recesses and the electrically conductive support material in the core of the anodized support member.

20 Claims, 4 Drawing Sheets

SEALING ASSEMBLIES AND PRESSURIZED FLUID VESSELS INCLUDING THE SEALING ASSEMBLIES

CROSS REFERENCES TO RELATED APPLICATIONS

This application claims the benefit of priority under 35 U.S.C. §119(e) to U.S. Provisional Application Ser. No. 61/781,320, filed Mar. 14, 2013.

TECHNICAL FIELD

The specification relates generally to sealing assemblies and, more specifically, to sealing assemblies for pressurized fluid vessels.

BACKGROUND

Pressure vessels for storing fluids typically include a pressure chamber that contains the pressurized fluid and a sealing assembly that seals the pressure chamber from the external environment. The sealing assembly may be connected to a valve or other device that permits controlled release of the compressed fluid from the pressure chamber, as well as controlled introduction of compressed fluid into the pressure chamber. Particularly when the pressure vessels are used to store hydrogen gas, suitable materials for use in the pressure vessel or its sealing assembly are limited to materials that are compatible with the hydrogen gas. For example, despite being advantageous for having a low weight, aluminum is known to weaken or become brittle through hydride formation on exposure to hydrogen gas and, therefore, is generally unsuitable for use in hydrogen applications as a substitute for heavier, more expensive metals such as titanium.

In view of the above, there remain ongoing needs for pressure vessels and sealing assemblies including alternate materials.

SUMMARY

Some embodiments herein are directed to sealing assemblies. The sealing assemblies may include at least one boss; a valve having a valve neck portion formed from a valve material. The valve neck portion may be disposed in the at least one boss. The sealing assemblies may further include a liner formed of a liner material. The liner may have an outer liner surface and an inner liner surface. The inner liner surface may define a containment volume of a pressure vessel adapted to contain a fluid. The liner may also have at least one liner neck portion formed therein. The inner liner surface of the at least one liner neck portion may face the valve, and the outer liner surface of the at least one liner neck portion may face the at least one boss. The sealing assemblies may further include a support member adapted to cooperate with the liner neck portion and the valve. The support member may include a support-member body formed from an anodized electrically conductive support material. The support member body may have an anodized inner sealing surface that abuts the valve neck portion and an anodized outer sealing surface that abuts the at least one liner neck portion. The anodized inner sealing surface and the anodized outer sealing surface may be substantially electrically nonconductive. The sealing assemblies may further include an inner seal disposed in an annular inner recess formed in the inner sealing surface of the support-member body. The inner seal may have electrically conductive inner-seal surfaces. The sealing assemblies may further include an outer seal disposed in an annular outer recess formed in the outer sealing surface of the support-member body. The outer seal may have electrically conductive outer-seal surfaces. In the sealing assemblies, the annular inner recess of the support member and the annular outer recess of the support member each comprise electrically conductive recess surfaces. Thereby, electric continuity between the valve and the liner is established through the electrically conductive inner-seal surfaces, the electrically conductive recess surfaces of the annular inner recess, the electrically conductive support material of the support-member body, the electrically conductive recess surfaces of the annular outer recess, and the electrically conductive outer-seal surfaces.

Other embodiments herein are directed to pressure vessels for containing pressurized hydrogen and including a sealing assembly according to embodiments herein. The pressure vessels may include sealing assembly comprising at least one boss, a metal valve, a metal liner that defines a containment volume adapted to contain the pressurized hydrogen, a composite shell that encompasses the liner, and a support member adapted to cooperate with the liner neck portion and the valve. The metal valve may have a valve neck portion disposed in the at least one boss. The metal liner may have an outer liner surface and an inner liner surface. The inner liner surface may define the containment volume. The metal liner may have at least one liner neck portion formed therein. The inner liner surface of the at least one liner neck portion faces the metal valve, and the outer liner surface of the at least one liner neck portion faces the at least one boss. The support member may be adapted to cooperate with the metal liner and the metal valve. In particular, the support member may include a support-member body formed from anodized aluminum. The support member body may have an anodized inner sealing surface that abuts the valve neck portion and an anodized outer sealing surface that abuts the at least one liner neck portion. The anodized inner sealing surface and the anodized outer sealing surface may be substantially electrically nonconductive. The support member may also include an inner conductive o-ring contacting bare aluminum surfaces of an annular inner recess formed in the inner sealing surface of the support-member body. The support member may also include and an outer conductive o-ring contacting bare aluminum surfaces of an annular outer recess formed in the outer sealing surface of the support-member body. Thereby, electric continuity between the metal valve and the metal liner may be established through the inner conductive o-ring, the bare aluminum surfaces of the annular inner recess, aluminum inside the support-member body, the bare aluminum surfaces of the annular outer recess, and the outer conductive o-ring.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
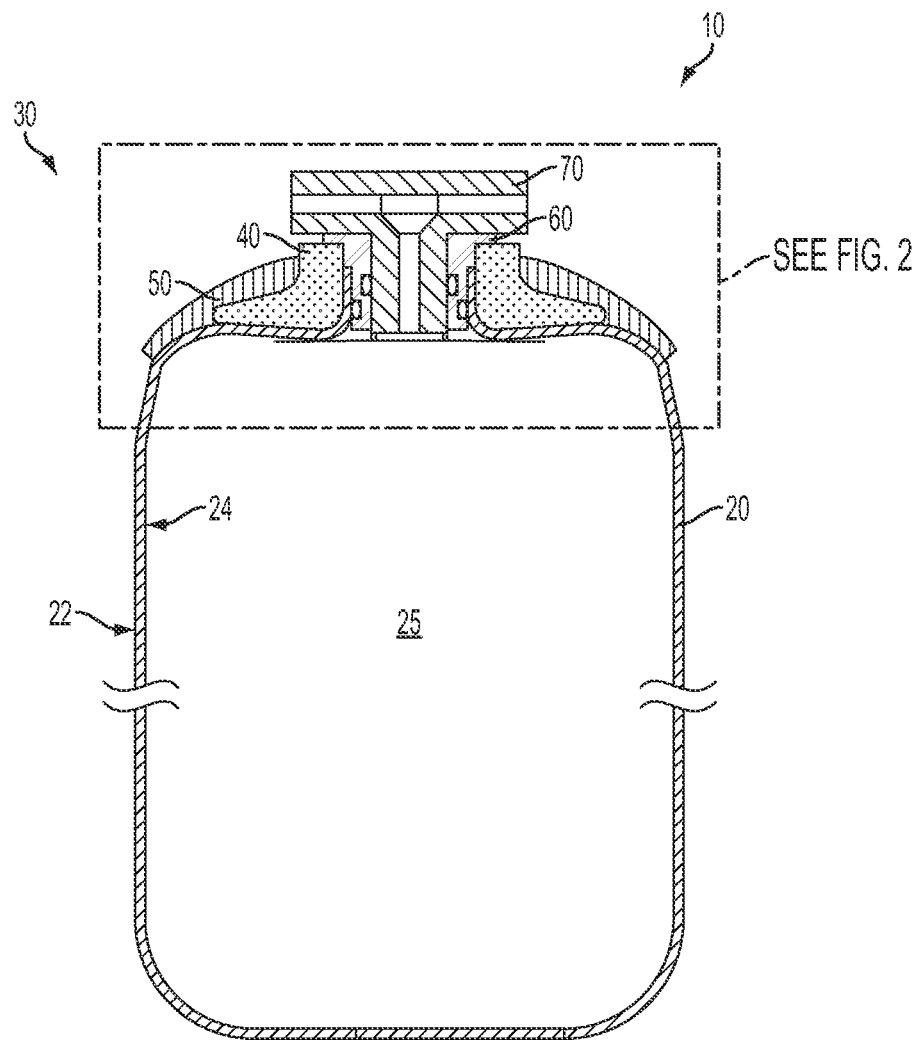
FIG. 1 is a pressure vessel having a containment volume defined by a liner of a sealing assembly according to embodiments described herein.

Embodiments of sealing assemblies will now be described with reference to FIGS. 1-4. According to some embodiments, a sealing assembly 30 may include at least one boss 40, a valve 70, a liner 20, and a support member 60. In some embodiments, the sealing assembly 30 may further include a composite shell 50 that encompasses the liner 20 and militates against damage to the liner 20. The liner 20 may have an liner outer surface 22 and an liner inner surface 24. The liner inner surface 24 may define a containment volume 25 of a pressure vessel 10 adapted to contain a fluid (not shown) such as a compressed liquid or a compressed gas, for example. The liner 20 may have at least one liner neck portion 26 formed therein. The liner 20 may be configured such that the liner inner surface 24 of the at least one liner neck portion 26 faces the valve 70 and the liner outer surface 22 of the at least one liner neck portion 26 faces the at least one boss 40.

The sealing assembly 30 may be adapted to cooperate with an article to be sealed. In some embodiments, the article to be sealed may be the liner 20 that defines the containment volume 25 of a pressure vessel 10. In particular, the at least one liner neck portion 26 of the liner 20 may be sealed around the valve 70, with the support member 60 interposed between the liner 20 and the valve 70, such that substantially fluid-tight seals are formed both between the liner 20 and the support member 60 and between the support member 60 and the valve 70. The substantially fluid-tight seals may prevent any fluid contained in the containment volume 25 from escaping to the external environment. In some embodiments, the pressure vessel 10 in which the containment volume 25 is defined may be a Type IV vessel or a Type V vessel for storing compressed fuel gases or liquids such as hydrogen, for example. The liner 20 may be formed from a liner material. In some embodiments, the liner material may comprise a polymer or a plastic, particularly a thermoplastic. In other embodiments, the liner material may be a metal. It should be understood that other materials known in the art of compressed gas storage may be suitable for use as the liner material.

The sealing assembly 30 may include at least one boss 40 for receiving the valve 70 therein. The at least one boss 40 may be produced from any conventional material such as a metal, for example. In some embodiments, the material used to form the at least one boss 40 may have a coefficient of thermal expansion less than a coefficient of thermal expansion of the material used to produce the article to be sealed, namely, the liner material. It is understood that the term "coefficient of thermal expansion" used herein refers to a rate of expansion of a material in response to a heating and a rate of contraction of the material in response to a cooling.

Figure 2:
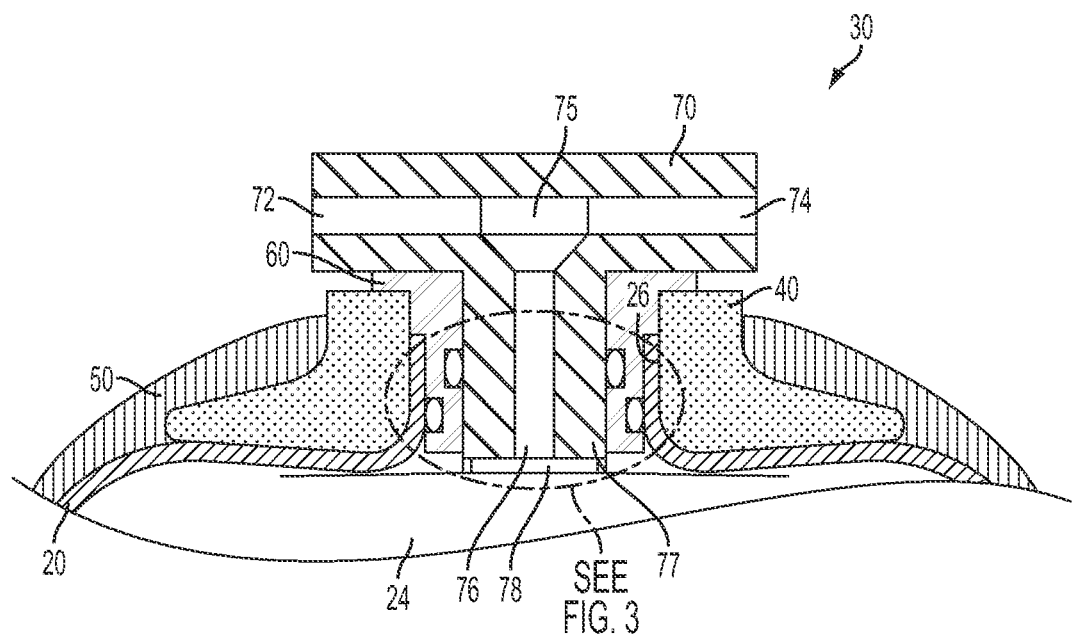
FIG. 2 is a detail view of the sealing assembly of FIG. 1.
Figure 3:
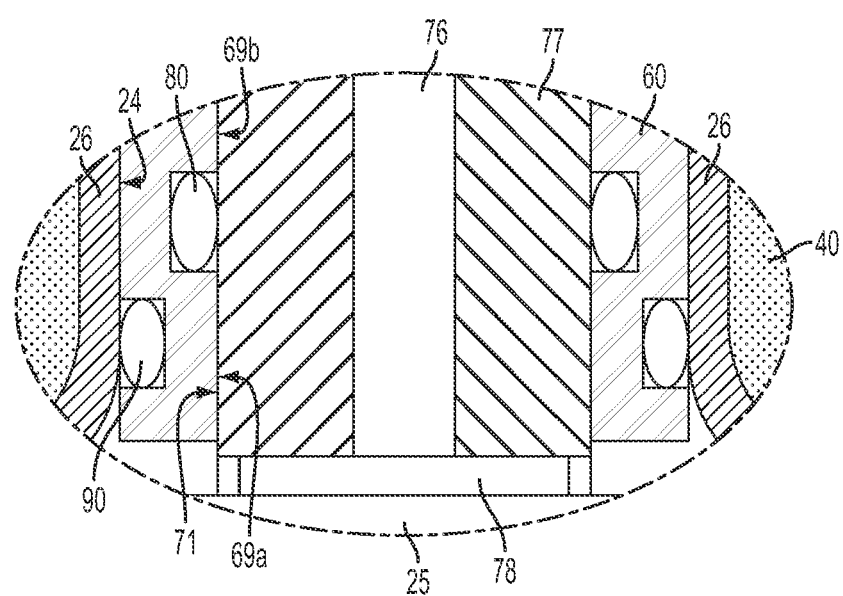
FIG. 3 is a detail view of an inner seal and an outer seal in a support member that is a component of the sealing assembly of FIGS. 1 and 2.

Referring with particularity to FIGS. 2 and 3, the sealing assembly 30 may include the valve 70. The valve 70 may include a valve neck portion 77 formed from a valve material. The valve neck portion 77 may be disposed in or surrounded by the at least one boss 40 of the sealing assembly 30. As shown in the embodiment of FIGS. 2 and 3, the valve 70 may include a valve inlet 72 and a valve outlet 74 that may join at a valve junction 75 with a tank conduit 76 that opens into the containment volume 25 at a conduit opening 78. Though the embodiment of FIGS. 2 and 3 includes a particular configuration of the valve inlet 72, the valve outlet 74, the valve junction 75, the tank conduit 76, and the conduit opening 78, it should be understood that the particular configuration is non-limiting and exemplary only. In general, the valve 70 may have any configuration that provides a pathway for compressed fluid to be filled into or removed out of the containment volume 25. Additionally, it should be understood that, when present, the valve inlet 72 and/or the valve outlet 74 may be connected to external devices (not shown) in fluidic communication with the containment volume 25. For example, in some embodiments, the valve inlet 72 may be placed in fluidic communication with a filling device (not shown) that supplies compressed fluid to the containment volume 25 and the valve outlet 74 may be placed in fluidic communication with a fuel system (not shown) such as a fuel cell or a combustion engine.

According to some embodiments, the liner 20 of the sealing assembly 30 may include at least one liner neck portion 26 formed therein. As shown in FIG. 3, the liner inner surface 24 in the at least one liner neck portion 26 faces the valve 70, and the liner outer surface 22 in the at least one liner neck portion 26 faces the at least one boss 40.

Figure 4:
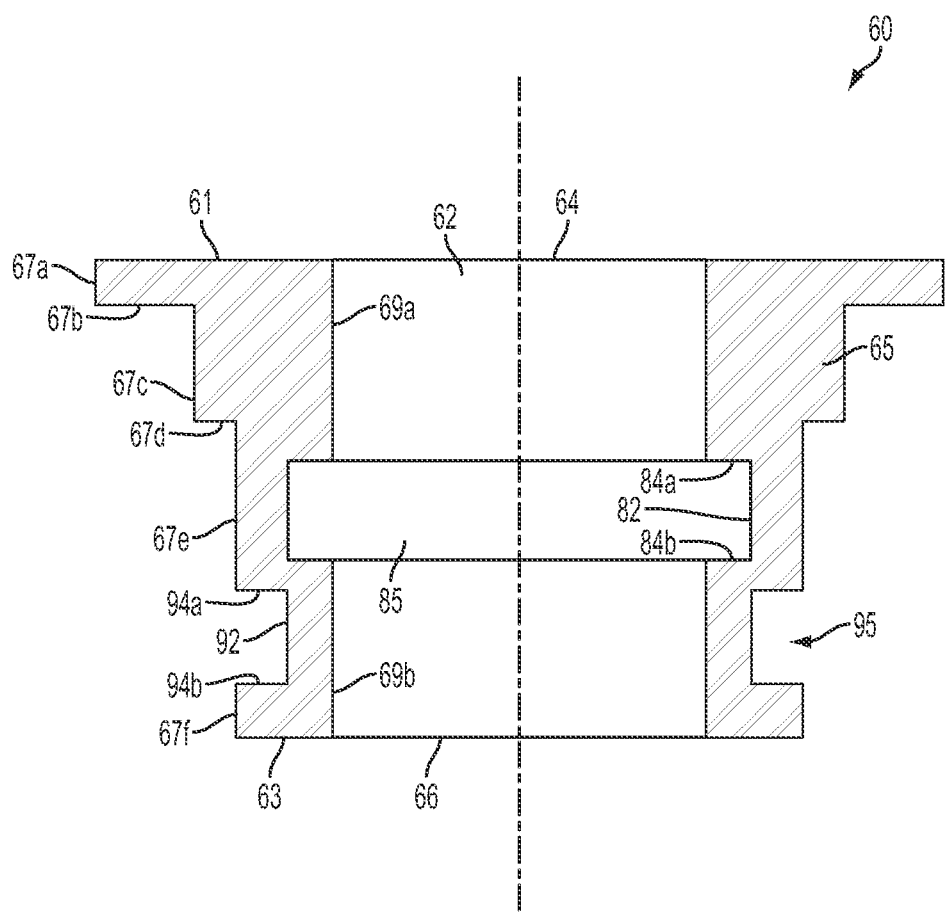
FIG. 4 is a cross-sectional plan view of the support member of the sealing assembly of FIGS. 1 and 2 with the inner seal and the outer seal removed.

Referring to FIGS. 2-4, the support member 60 of the sealing assembly 30 is adapted to cooperate with the at least one liner neck portion 26 and the valve 70. In particular, the support member 60 receives the valve neck portion 77 while sealing both the valve 70 and the liner 20 against leakage of any compressed fluid from the containment volume 25. In some embodiments, the support member 60 has a generally circular cross-sectional shape and has a passage 62 formed therethrough from a first end 64 to a second end 66 to facilitate fluidic communication between the containment volume 25 and the conduit opening 78 of the valve 70.

Referring to FIGS. 3 and 4, the support member 60 may include a support-member body 65 formed from an anodized electrically conductive support material. The electrically conductive support material may be any material capable of being anodized. In some embodiments, the electrically conductive support material may be any metal capable of being anodized, such as aluminum, titanium, zinc, magnesium, niobium, zirconium, hafnium, tantalum, or alloys of any of these, for example. In preferred embodiments, the anodized electrically conductive support material is compatible with the compressed fluid intended to be held in the containment volume 25, such as hydrogen, for example. In other preferred embodiments, the anodized electrically conductive support material may have a coefficient of thermal expansion less than the coefficient of thermal expansion of the valve material. In especially preferred embodiments, the support-member body 65 is formed from anodized aluminum. Without intent to be bound by theory, it is believed that whereas bare aluminum may be susceptible to weakening or cracking when exposed to compressed fluids such as hydrogen (through hydride formation, for example), anodized aluminum may exhibit a high degree of imperviousness and resistance to attack by hydrogen molecules. Thus, anodization may render an otherwise unusable material entirely suitable to embodiments of the sealing assembly 30 described herein.

In some embodiments, the support-member body 65 may include anodized inner sealing surfaces 69a, 69b that abut the valve neck portion 77. The support member body may also include anodized outer sealing surfaces 67a-f. One or more of the anodized outer sealing surfaces 67a-f abut the at least one liner neck portion 26 of the liner 20. For example, when the support member 60 is implemented into the sealing assembly 30 as shown in FIG. 2, of the anodized outer sealing surfaces 67a-f labeled on the support member 60 of FIG. 4, three anodized outer sealing surfaces 67d, 67e, 67f will abut the at least one liner neck portion 26 of the liner 20. In some embodiments, one or both of the support-member top surface 61 and the support-member bottom surface 63 may also be anodized surfaces. In preferred embodiments, at least the support-member bottom surface 63 is an anodized surface. In preferred embodiments, the support-member body 65 is formed from anodized aluminum, whereby the anodized inner sealing surfaces 69a, 69b, the anodized outer sealing surfaces 67a-f and, optionally, one or both of the support-member top surface 61 and the support-member bottom surface 63 are substantially electrically nonconductive layers of aluminum oxide. In some embodiments, the substantially electrically nonconductive layers of aluminum oxide are sufficiently thick to prevent electric continuity between the valve 70 and the liner 20 across any of the anodized surfaces of the support member 60.

Forming the support member 60 from an anodized electrically conductive material having only anodized surfaces may facilitate the use of alternative materials in the sealing assembly 30 (such as aluminum, for example) that in general are not compatible with applications involving compressed fluids such as hydrogen. Nevertheless, particularly for hydrogen storage applications, it may be desirable for electric continuity to be established between all components of the sealing assembly 30, so that all components of the sealing assembly 30 may be maintained at the same electric potential. When components are at equal electric potentials, electric arcing cannot occur between the components. For example, if the valve 70 is generally at ground potential, a lack of electric continuity between the valve 70 and the liner 20 can permit the liner 20 to have a higher or lower electric potential than the valve 70. Therefore, additional features of the support member 60 and the sealing assembly 30 may be provided to establish electric continuity between the liner 20 and the valve 70. Exemplary additional features of this kind will now be described.

According to preferred embodiments, the support member 60 includes an annular inner recess 85 formed in the anodized inner sealing surfaces 69a, 69b of the support member 60 that are in contact with the valve 70. The annular inner recess 85 may be defined by an inner lateral surface 82, an inner valve-side surface 84a perpendicular to the inner lateral surface 82, and an inner vessel-side surface 84b parallel to the inner valve-side surface 84a. At least one of the inner lateral surface 82, the inner valve-side surface 84a, and the inner valve-side surface 84b is electrically conductive. Preferably, all of the inner lateral surface 82, the inner valve-side surface 84a, and the inner valve-side surface 84b are electrically conductive. In this regard, electrical conductivity of any or all of the inner lateral surface 82, the inner valve-side surface 84a, and the inner valve-side surface 84b means that electrical continuity is present between a conductive surface and the electrically conductive material within the support-member body 65. In preferred embodiments, the anodized conductive support material is anodized aluminum and the electrically conductive recess surfaces 82, 84a, 84b in the annular inner recess 85 are bare aluminum. It should be understood that the rectangular shape of the annular inner recess 85 exemplified in the embodiment of FIG. 3 is intended as illustrative and non-limiting. In other embodiments, the annular outer recess 95 may have any suitable geometry such as round, for example.

In some embodiments, conductive surfaces of the annular inner recess 85 may be formed by first molding or casting the support member 60 to include the annular inner recess 85, anodizing the support-member body 65, then removing any anodized material from within the annular inner recess 85 to expose bare metal. In other embodiments, conductive surfaces of the annular inner recess 85 may be formed by fabricating the support member 60 without the annular inner recess 85, anodizing the support-member body 65, then carving out the annular inner recess 85 to expose bare metal. In other embodiments, conductive surfaces of the annular inner recess 85 may be formed by molding or casting the support member 60 to include the annular inner recess 85 then anodizing only the inner sealing surfaces 69a, 69b without anodizing the inner lateral surface 82, the inner valve-side surface 84a, or the inner valve-side surface 84b of the annular inner recess 85.

According to preferred embodiments, the support member 60 also includes an annular outer recess 95 formed in the anodized outer sealing surfaces 67e, 67f of the support member 60 that abut the liner inner surface 24 in the at least one liner neck portion 26 of the liner 20. The annular outer recess 95 may be defined by an outer lateral surface 92, an outer valve-side surface 94a perpendicular to the outer lateral surface 92, and an outer vessel-side surface 94b parallel to the outer valve-side surface 94a. At least one of the outer lateral surface 92, the outer valve-side surface 94a, and the outer valve-side surface 94b is electrically conductive. Preferably, all of the outer lateral surface 92, the outer valve-side surface 94a, and the outer valve-side surface 94b are electrically conductive. In this regard, electrical conductivity of any or all of the outer lateral surface 92, the outer valve-side surface 94a, and the outer valve-side surface 94b means that electrical continuity is present between a conductive surface and the electrically conductive material within the support-member body 65. In preferred embodiments, the anodized conductive support material is anodized aluminum and the electrically conductive recess surfaces 92, 94a, 94b in the annular outer recess 95 are bare aluminum. It should be understood that the rectangular shape of the annular outer recess 95 exemplified in the embodiment of FIG. 3 is intended as illustrative and non-limiting. In other embodiments, the annular outer recess 95 may have any suitable geometry such as round, for example.

In some embodiments, conductive surfaces of the annular outer recess 95 may be formed by first molding or casting the support member 60 to include the annular outer recess 95, anodizing the support-member body 65, then removing any anodized material from within the annular outer recess 95 to expose bare metal. In other embodiments, conductive surfaces of the annular outer recess 95 may be formed by fabricating the support member 60 without the annular outer recess 95, anodizing the support-member body 65, then carving out the annular outer recess 95 to expose bare metal. In other embodiments, conductive surfaces of the annular outer recess 95 may be formed by molding or casting the support member 60 to include the annular outer recess 95 then anodizing only the outer sealing surfaces 67a-f without anodizing the outer lateral surface 92, the outer valve-side surface 94a, or the outer valve-side surface 94b of the annular outer recess 95.

Referring to FIGS. 2 and 3, in preferred embodiments the support member 60 of the sealing assembly 30 includes an inner seal 80 disposed in the annular inner recess 85 formed in the inner sealing surfaces 69a, 69b of the support-member body 65. In some embodiments, the inner seal 80 may be any suitable sealing member such as an o-ring, for example. In some embodiments, the material used to form the inner seal 80 may have a coefficient of thermal expansion similar to the coefficient of thermal expansion of the valve material. It should be understood that the inner seal 80 of FIG. 3 with its oval-shaped cross section is intended for illustration only and that the inner seal 80 may have any desired cross section. For example, the inner seal 80 may have a rectangular cross-section to fill the annular inner recess 85 of the embodiment of FIG. 3, if desired.

The inner seal 80 includes electrically conductive inner-seal surfaces. The electrically conductive inner-seal surfaces of the inner seal 80 include all points of contact of the inner seal 80 with the valve 70 and all points of contact of the inner seal 80 with electrically conductive surfaces of the annular inner recess 85. In some embodiments, the inner seal 80 may be formed from a conductive material such as a metal or a conductive polymer, for example. In such embodiments, all surfaces of the inner seal 80 may be electrically conductive. In other embodiments, the inner seal 80 may be formed from a nonconductive material such as a plastic or rubber, for example, and the nonconductive material may be coated with any suitable conductive material such as a metal, for example. In such embodiments, only the portions of the inner seal 80 that are coated with the conductive material may be electrically conductive. In preferred embodiments, the inner seal 80 is formed from a material known to be compatible with the compressed fluid (such as hydrogen, for example) intended to be stored in the containment volume 25 or is coated with a material known to be compatible with the compressed fluid.

In preferred embodiments the support member 60 of the sealing assembly 30 also includes an outer seal 90 disposed in the annular outer recess 95 formed in the outer sealing surfaces 67e, 67f of the support-member body 65. In some embodiments, the outer seal 90 may be any suitable sealing member such as an o-ring, for example. In some embodiments, the material used to form the outer seal 90 may have a coefficient of thermal expansion similar to the coefficient of thermal expansion of the valve material. It should be understood that the outer seal 90 of FIG. 3 with its oval-shaped cross section is intended for illustration only and that the outer seal 90 may have any desired cross section. For example, the outer seal 90 may have a rectangular cross-section to fill the annular outer recess 95 of the embodiment of FIG. 3, if desired.

The outer seal 90 includes electrically conductive outer-seal surfaces. The electrically conductive outer-seal surfaces of the outer seal 90 include all points of contact of the outer seal 90 with the valve 70 and all points of contact of the outer seal 90 with electrically conductive surfaces of the annular outer recess 95. In some embodiments, the outer seal 90 may be formed from a conductive material such as a metal or a conductive polymer, for example. In such embodiments, all surfaces of the outer seal 90 may be electrically conductive. In other embodiments, the outer seal 90 may be formed from a nonconductive material such as a plastic or rubber, for example, and the nonconductive material may be coated with any suitable conductive material such as a metal, for example. In such embodiments, only the portions of the outer seal 90 that are coated with the conductive material may be electrically conductive. In preferred embodiments, the outer seal 90 is formed from a material known to be compatible with the compressed fluid (such as hydrogen, for example) intended to be stored in the containment volume 25 or is coated with a material known to be compatible with the compressed fluid.

As described in the embodiments above, the support member 60 is formed of an electrically conductive material having only nonconductive anodized surfaces abutting the liner 20 and the valve 70. However, the support member 60 also includes the annular inner recess 85 and the annular outer recess 95, both of which include at least one electrically conductive surface such as the bare, non-anodized electrically conductive material of the support member 60. The inner seal 80 is an electric conductor, or at least has conductive outer surfaces, and is seated in the annular inner recess 85. The outer seal 90 is an electric conductor, or at least has conductive outer surfaces, and is seated in the annular outer recess 95. In the sealing assembly 30, conductive surfaces of the inner seal 80 contact corresponding conductive surfaces of both the support member 60 (particularly, the electrically conductive recess surfaces 82, 84a, 84b in the annular inner recess 85) and the valve 70 (particularly, of the valve outer surface 71). Likewise, conductive surfaces of the outer seal 90 contact corresponding conductive surfaces of both the support member 60 (particularly, the electrically conductive recess surfaces 92, 94a, 94b in the annular outer recess 95) and the liner 20 (particularly, of the liner inner surface 24 in the at least one liner neck portion 26).

Thus, in the sealing assembly 30 according to the embodiments described above, electric continuity between the valve 70 and the liner 20 is established via a continuity path from the valve 70; to the electrically conductive surfaces of the inner seal 80; then to the electrically conductive recess surfaces 82, 84a, 84b of the annular inner recess 85; then to the electrically conductive support material of the support-member body 65; then to the electrically conductive recess surfaces 92, 94a, 94b of the annular outer recess 95; then to the electrically conductive surfaces of the outer seal 90; and finally to the liner 20. This electric continuity between the valve 70 and the liner 20 enables maintenance of the valve 70 and the liner 20 at the same electric potential. In preferred embodiments, for example, both the valve 70 and the liner 20 may be maintained at ground potential. It is believed, therefore, that the use of conductive seals (such as inner seal 80 and outer seal 90) seated in conductive recesses (such as annular inner recess 85 and annular outer recess 95) with electrically conductive recess surfaces 82, 84a, 84b, 92, 94a, 94b may facilitate wider use of alternative materials for support members in sealing assemblies for compressed fluid vessels, including, but not limited to, the use of anodized aluminum support members for sealing assemblies of hydrogen storage vessels.

According to further embodiments, a pressure vessel 10 may include a sealing assembly 30 as described according to any combination of embodiments described above. In particularly preferred embodiments, the pressure vessel 10 may include a sealing assembly, in which the support member 60 is anodized aluminum, the inner seal 80 and the outer seal 90 are conductive o-rings, preferably metal o-rings, that contact bare aluminum surfaces of the annular inner recess 85 and the annular outer recess 95, respectively. In other such preferred embodiments, the valve 70 and the liner 20 both are metal. Thereby, electric continuity between the metal valve and the metal liner may be established first through the inner conductive o-ring, then through the bare aluminum surfaces of the annular inner recess, then through aluminum inside the support-member body, then through the bare aluminum surfaces of the annular outer recess, and finally through the outer conductive o-ring.

According to further embodiments, a fuel system for an automobile may include a pressure vessel 10 that includes a sealing assembly 30 as described according to any combination of embodiments described above.

Unless otherwise defined, all technical and scientific terms used herein have the same meaning as commonly understood by one of ordinary skill in the art to which the claimed subject matter belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that terms like "preferably," "commonly," and "typically" are not utilized herein to limit the scope of the appended claims or to imply that certain features are critical, essential, or even important to the structure or function of the claimed subject matter. Rather, these terms are merely intended to highlight alternative or additional features that may or may not be utilized in a particular embodiment.

What is claimed is:

1. A sealing assembly comprising:
    at least one boss;
    a valve having a valve neck portion formed from a valve material, the valve neck portion disposed in the at least one boss;
    a liner formed of a liner material, the liner having an outer liner surface and an inner liner surface, the inner liner surface defining a containment volume of a pressure vessel adapted to contain a compressed fluid, the liner having at least one liner neck portion formed therein, the inner liner surface of the at least one liner neck portion facing the valve, the outer liner surface of the at least one liner neck portion facing the at least one boss; and
    a support member adapted to cooperate with the liner neck portion and the valve, the support member comprising:
        a support-member body formed from an anodized electrically conductive support material, the support member body having an anodized inner sealing surface that abuts the valve neck portion and an anodized outer sealing surface that abuts the at least one liner neck portion, the anodized inner sealing surface and the anodized outer sealing surface being substantially electrically nonconductive;
        an inner seal disposed in an annular inner recess formed in the inner sealing surface of the support-member body, the inner seal comprising electrically conductive inner-seal surfaces; and
        an outer seal disposed in an annular outer recess formed in the outer sealing surface of the support-member body, the outer seal comprising electrically conductive outer-seal surfaces,
    wherein:
        the annular inner recess of the support member and the annular outer recess of the support member comprise electrically conductive recess surfaces;
        electric continuity between the valve and the liner is established through the electrically conductive inner-seal surfaces, the electrically conductive recess surfaces of the annular inner recess, the electrically conductive support material of the support-member body, the electrically conductive recess surfaces of the annular outer recess, and the electrically conductive outer-seal surfaces.

2. The sealing assembly of claim 1, wherein the anodized electrically conductive support material is anodized aluminum.

3. The sealing assembly of claim 2, wherein the anodized inner sealing surface and the anodized outer sealing surface are coated with substantially electrically nonconductive layers of aluminum oxide.

4. The sealing assembly of claim 3, wherein the substantially electrically nonconductive layers of aluminum oxide are sufficiently thick to prevent electric continuity between the valve and the liner across any anodized surfaces of the support member.

5. The sealing assembly of claim 1, wherein:
    the anodized conductive support material is anodized aluminum;
    the anodized inner sealing surface and the anodized outer sealing surface are aluminum oxide;
    the electrically conductive recess surfaces in the annular inner recess and the annular outer recess are bare aluminum.

6. The sealing assembly of claim 5, wherein:
    the inner seal and the outer seal are electrically conductive metal o-rings;
    the inner seal contacts the bare aluminum in the annular inner recess; and
    the outer seal contacts the bare aluminum in the annular outer recess.

7. The sealing assembly of claim 1, wherein the inner seal and the outer seal are o-rings.

8. The sealing assembly of claim 1, wherein the inner seal and the outer seal are o-rings formed from a conductive o-ring material.

9. The sealing assembly of claim 8, wherein the conductive o-ring material is a metal or a conductive polymer.

10. The sealing assembly of claim 8, wherein the inner seal and the outer seal are o-rings formed from a nonconductive o-ring material that is coated with a conductive o-ring coating material.

11. The sealing assembly of claim 10, wherein the nonconductive o-ring material is a plastic or a rubber and the conductive o-ring coating material is a metal.

12. The sealing assembly of claim 1, wherein:
    the annular inner recess is defined by an inner lateral surface, an inner valve-side surface perpendicular to the inner lateral surface, and an inner vessel-side surface parallel to the inner valve-side surface;
    the annular outer recess is defined by an outer lateral surface, an outer valve-side surface perpendicular to the outer lateral surface, and an outer vessel-side surface parallel to the outer valve-side surface;
    at least one of the inner lateral surface, the inner valve-side surface, and the inner valve-side surface is electrically conductive; and
    at least one of the outer lateral surface, the outer valve-side surface, and the outer valve-side surface is electrically conductive.

13. The sealing assembly of claim 12, wherein each of the inner lateral surface, the inner valve-side surface, and the inner valve-side surface, the outer valve-side surface, and the outer valve-side surface are electrically conductive.

14. The sealing assembly of claim 1, wherein the electric continuity maintains the valve and the liner at the same electric potential.

15. The sealing assembly of claim 1, wherein the electric continuity maintains the valve and the liner at ground potential.

16. The sealing assembly of claim 1, wherein the compressed fluid is hydrogen.

17. The sealing assembly of claim 1, wherein the liner material and the valve material both are metals.

18. The sealing assembly of claim 1, wherein substantially fluid-tight seals are formed both between the liner and the support member and between the support member and the valve.

19. The sealing assembly of claim 1, further comprising a composite shell that encompasses the liner.

20. A pressure vessel for containing pressurized hydrogen, the pressure vessel comprising:
  sealing assembly comprising at least one boss, a metal valve, a metal liner that defines a containment volume adapted to contain the pressurized hydrogen, a composite shell that encompasses the liner, and a support member adapted to cooperate with the liner neck portion and the valve,
wherein:
  the metal valve has a valve neck portion disposed in the at least one boss;
  the metal liner has an outer liner surface and an inner liner surface;
  the inner liner surface defines the containment volume;
  the metal liner has at least one liner neck portion formed therein;
  the inner liner surface of the at least one liner neck portion faces the metal valve;
  the outer liner surface of the at least one liner neck portion faces the at least one boss;
  the support member is adapted to cooperate with the metal liner and the metal valve;
  the support member comprises:
    a support-member body formed from anodized aluminum, the support member body having an anodized inner sealing surface that abuts the valve neck portion and an anodized outer sealing surface that abuts the at least one liner neck portion, the anodized inner sealing surface and the anodized outer sealing surface being substantially electrically nonconductive;
    an inner conductive o-ring contacting bare aluminum surfaces of an annular inner recess formed in the inner sealing surface of the support-member body; and
    an outer conductive o-ring contacting bare aluminum surfaces of an annular outer recess formed in the outer sealing surface of the support-member body;
  electric continuity between the metal valve and the metal liner is established through the inner conductive o-ring, the bare aluminum surfaces of the annular inner recess, aluminum inside the support-member body, the bare aluminum surfaces of the annular outer recess, and the outer conductive o-ring.

\* \* \* \* \*